US012627373B2

(12) United States Patent
Wu

(10) Patent No.: US 12,627,373 B2
(45) Date of Patent: May 12, 2026

(54) EQUALIZATION APPARATUS, OPTICAL COMMUNICATION SYSTEM, AND EQUALIZING METHOD OF OPTICAL SIGNALS

(71) Applicant: NEC Corporation, Tokyo (JP)

(72) Inventor: Mingqi Wu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 333 days.

(21) Appl. No.: 18/392,073

(22) Filed: Dec. 21, 2023

(65) Prior Publication Data

US 2024/0223275 A1      Jul. 4, 2024

(30) Foreign Application Priority Data

Dec. 28, 2022    (JP) ................................. 2022-211666

(51) Int. Cl.
    *H04B 10/079*          (2013.01)
(52) U.S. Cl.
    CPC .................................. *H04B 10/079* (2013.01)
(58) Field of Classification Search
    None
    See application file for complete search history.

(56) References Cited

U.S. PATENT DOCUMENTS

2009/0028552 A1 *    1/2009    Zhang .................... H04B 10/85
                                                            398/25

FOREIGN PATENT DOCUMENTS

| JP | 2016-519857 A | 7/2016 |
|----|----|----|
| JP | 2020-136831 A | 8/2020 |
| JP | 6786404 B2 | 11/2020 |
| WO | 2021/019620 A1 | 2/2021 |
| WO | 2022/264241 A1 | 12/2022 |
| WO | 2022/264474 A1 | 12/2022 |

* cited by examiner

*Primary Examiner* — David W Lambert
(74) *Attorney, Agent, or Firm* — Sughrue Mion, PLLC

(57)          ABSTRACT

Channel monitoring means monitors channel quality information of a plurality of optical signals of a plurality of channels transmitted from a transmitting apparatus and received by a receiving apparatus, and outputting first information including the monitored channel quality information, the transmitting apparatus processing a plurality of data signals to transform them into a plurality of mixed data signals using a transfer matrix and converting the plurality of mixed signals into the plurality of optical signals. Estimation means estimates transmission a first objective between the transmitting apparatus and the receiving apparatus based on the first information and second information received from the transmitting apparatus, and outputting an estimation result. Matrix configurating means configures the transfer matrix based on the estimation result to optimize the first objective between the transmitting apparatus and the receiving apparatus, and outputting the configured transfer matrix to the transmitting apparatus for updating the transfer matrix therein.

17 Claims, 9 Drawing Sheets

START

S1 — OBTAIN CHANNEL QUALITY INFORMATION

S21    S2                                                    S22

ESTIMATE CAPACITY FOR
FIRST CONFIGURATION OF
TRANSFER MATRIX

ESTIMATE CAPACITY FOR
SECOND CONFIGURATION OF
TRANSFER MATRIX

S3 — DETERMINE OPTIMIZED CONFIGURATION OF
TRANSFER MATRIX BASED ON ESTIMATION

S4 — CONFIGURE TRANSFER MATRIX AND
INVERSE TRANSFER MATRIX

TAB1

| PRE-EQUALIZATION CHANNEL QUALITY (INPUT VALUE) | | POST-EQUALIZATION CHANNEL QUALITY (OUTPUT VALUE) |
|---|---|---|
| CHANNEL 1 | CHANNEL 2 | |
| 8 | 10 | 9 |
| 8 | 12 | 11 |
| 10 | 12 | 11.5 |

TAB2

| CHANNEL QUALITY (INPUT VALUE) | CHANNEL CAPACITY (OUTPUT VALUE) |
|:---:|:---:|
| 8 | 80GBps |
| 9 | 100Gbps |
| 10 | 150Gbps |

EQUALIZATION APPARATUS, OPTICAL COMMUNICATION SYSTEM, AND EQUALIZING METHOD OF OPTICAL SIGNALS

INCORPORATION BY REFERENCE

This application is based upon and claims the benefit of priority from Japanese patent application No. 2022-211666, filed on Dec. 28, 2022, the disclosure of which is incorporated herein in its entirety by reference.

TECHNICAL FIELD

The present disclosure relates to an equalization apparatus, an optical communication system, and an equalizing method of optical signals.

BACKGROUND ART

To meet the increasing demand for higher communication capacity in optical fiber transmission, technology development leads to multiplexing techniques in many perspectives of resources such as wavelength division multiplexing (WDM) and space division multiplexing (SDM). Signal modulation techniques such as high-order quadrature amplitude modulation (QAM), probabilistic constellation shaping (PCS), and geometric constellation shaping (GCS) are also developed to approach the Shannon limit.

When multiplexing technique is applied, signals are transmitted simultaneously in a plurality of channels. In transmission using the WDM, channels are frequency bands and corresponding elements during transmission. In transmission using the SDM, channels are cores in a multi-core fiber (MCF) and corresponding elements during transmission. In particular, when the SDM is used with an uncoupled MCF, performance differences between channels occur due to a plurality of causes. Additionally, the performance differences accumulate in long-distance transmission due to the noise figure and the gain control by Erbium-Doped Fiber Amplifiers (EDFA) in repeaters. The performance distance becomes the bottleneck of the overall capacity of the SDM transmission. Thus, it is necessary to eliminate the performance differences between channels in multiplexing transmission. It is noted that the performance differences can be quantified by a plurality of indicators such as Quality factor (Q-factor), signal-to-noise ratio (SNR), bit error rate (BER), and error vector magnitude (EVM).

Japanese Patent No. 6786404 discloses an equalization method that can eliminate Q-factor differences between channels in SDM transmission with an uncoupled MCF. On the transmitter side, two channels of data vectors are equally separated and mixed by a matrix before transmitting. On the receiver side, two channels of restored vectors are equivalent to suffering the average of distortions from both cores during the transmission. As a result, the Q-factor difference between two channels can be eliminated.

Although the method disclosed in PTL1 can eliminate the Q-factor difference in the SDM, the disclosed transfer matrix introduces a penalty to the channels. This is due to the equal separation and mixing of signal vectors.

International Patent Application No. PCT/JP2021/022600 discloses another equalization method that can eliminate the Q-factor difference between channels in SDM transmission with an uncoupled MCF. Compared to PTL1, a channel monitor is placed on the receiver side and the coefficients of matrix are determined by channel condition information from the channel monitor. As a result, the Q-factor difference can be eliminated with lower penalty compared with PTL1. Further other equalization methods have been also proposed in International Patent Application Publication No. WO 2021/019620, Japanese Unexamined Patent Application Publication No. 2020-136831, and Published Japanese Translation of PCT International Publication for Patent Application, No. 2016-519857, for example.

SUMMARY

The abovementioned methods can eliminate the Q-factor difference in the SDM to improve overall capacity in transmission using a conventional QAM signal. However, in a transmission system using constellation-shaped signals, these methods may not be able to maximize total spectral efficiency (SE). In other words, the total transmission capacity may decrease with these methods when the constellation-shaped signals are used in the transmission. The reason for a decrease in overall capacity will be explained as follows.

Traditional coherent signal modulation based on QAM has limitations related to granularity and flexibility in transmission. To address these limitations while pushing the limit closer to the Shannon limit, constellation shaping technologies have been developed and commercialized including PCS and GCS. In QAM, each constellation point has the same probability of being used. In PCS, lower-energy constellation points are more frequently used, and higher-energy constellation points are less frequently used. The probability distribution is determined and realized by an encoder. By configuring the shape of probability distribution in the encoder, PCS can provide closer increments of data rate in transmission than traditional QAM. Considering a two-channel SDM transmission system, huge benefits in data rate can be achieved from PCS in the better-quality channel before equalization. The data rate merit may overtake the merit of equalizing the better channel and worse channel into two intermediate channels. In this case, the overall data rate decreases with equalization techniques.

An objective of this disclosure is to provide an equalization apparatus, an optical communication system, and an equalizing method of optical signals that An aspect of the present disclosure is an equalization apparatus including: channel monitoring means for monitoring channel quality information of a plurality of optical signals of a plurality of channels transmitted from a transmitting apparatus and received by a receiving apparatus, and outputting first information including the monitored channel quality information, the transmitting apparatus processing a plurality of data signals to transform them into a plurality of mixed data signals using a transfer matrix and converting the plurality of mixed signals into the plurality of optical signals; estimation means for estimating transmission capacity between the transmitting apparatus and the receiving apparatus based on the first information and second information received from the transmitting apparatus, and outputting an estimation result; and matrix configurating means for configuring the transfer matrix based on the estimation result to optimize the transmission capacity between the transmitting apparatus and the receiving apparatus, and outputting the configured transfer matrix to the transmitting apparatus for updating the transfer matrix therein.

An aspect of the present disclosure is an optical communication system including: a transmitting apparatus configured to process a plurality of data signals to transform them into a plurality of mixed data signals using a transfer matrix and to convert the plurality of mixed signals into a plurality of optical signals; a receiving apparatus configured to receive the plurality of optical signals transmitted from the transmitting apparatus; and an equalization apparatus, in which the equalization apparatus includes: channel monitoring means for monitoring channel quality information of the plurality of optical signals of a plurality of channels transmitted from the transmitting apparatus and received by the receiving apparatus, and outputting first information including the monitored channel quality information; estimation means for estimating transmission capacity between the transmitting apparatus and the receiving apparatus based on the first information and second information received from the transmitting apparatus, and outputting an estimation result; and matrix configurating means for configuring the transfer matrix based on the estimation result to optimize the transmission capacity between the transmitting apparatus and the receiving apparatus, and outputting the configured transfer matrix to the transmitting apparatus for updating the transfer matrix therein.

An aspect of the present disclosure is an equalizing method of optical signals including: monitoring channel quality information of a plurality of optical signals of a plurality of channels transmitted from a transmitting apparatus and received by a receiving apparatus, and outputting first information including the monitored channel quality information, the transmitting apparatus processing a plurality of data signals to transform them into a plurality of mixed data signals using a transfer matrix and converting the plurality of mixed signals into the plurality of optical signals; estimating transmission capacity between the transmitting apparatus and the receiving apparatus based on the first information and second information received from the transmitting apparatus, and outputting an estimation result; and configuring the transfer matrix based on the estimation result to optimize the transmission capacity between the transmitting apparatus and the receiving apparatus, and outputting the configured transfer matrix to the transmitting apparatus for updating the transfer matrix therein.

According to the present disclosure, it is possible to provide an equalization apparatus, an equalization method, and an optical transmission system that optimizes overall data rate in multiplexing transmission.

4

Figure 10:
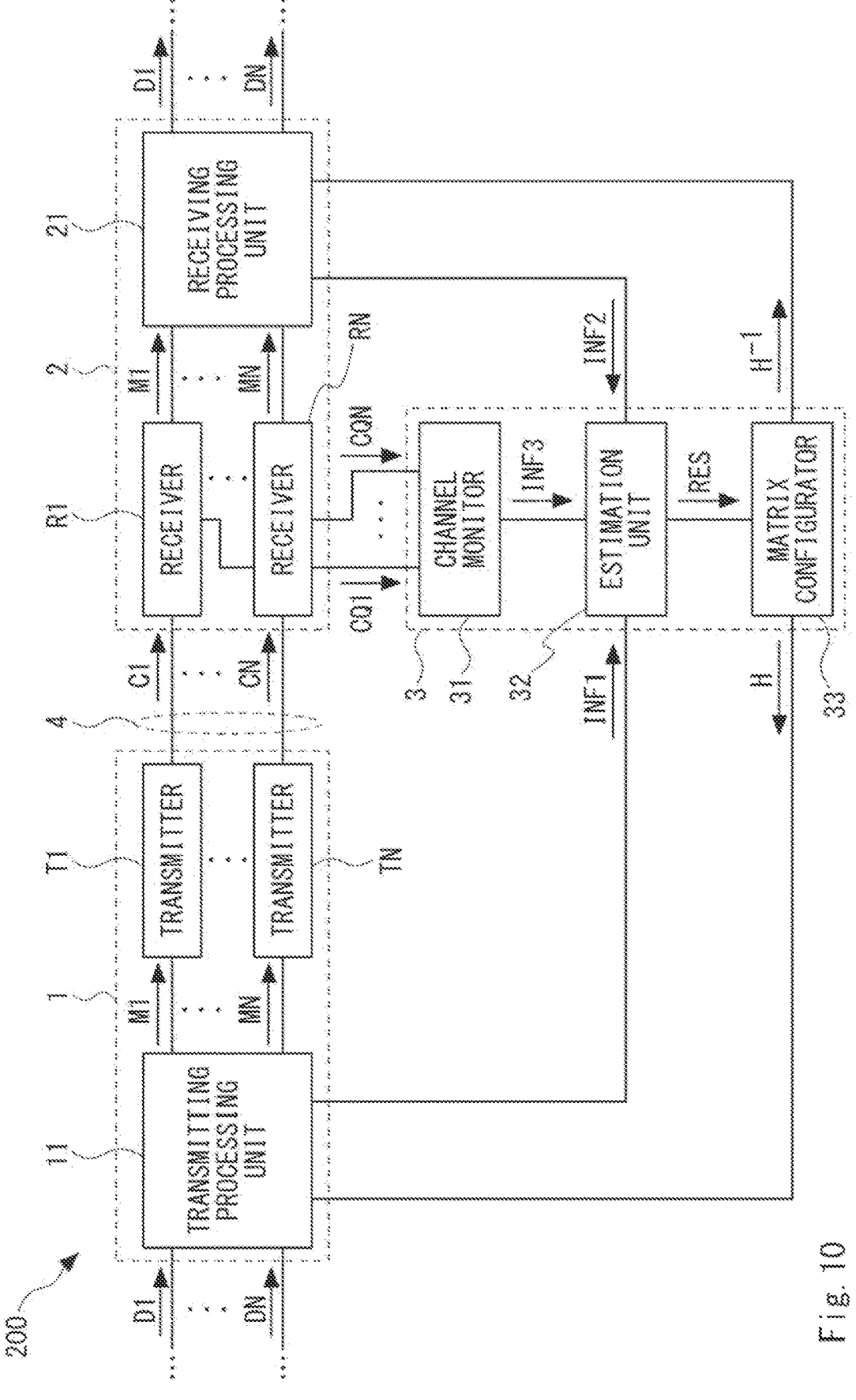

FIG. 10 schematically illustrates a configuration of an optical communication system according to a second example embodiment.

EXAMPLE EMBODIMENTS

Example embodiments of the present disclosure will be described below with reference to the drawings. The same components are denoted by the same reference numerals throughout the drawings, and a repeated explanation is omitted as needed.

First Example Embodiment

An optical communication system according to a first example embodiment will be described. The optical communication system according to a first example embodiment is configured for transmission with a plurality of channels. Here, for simplification, the optical communication system for the transmission with two channels will be described.

Figure 1:
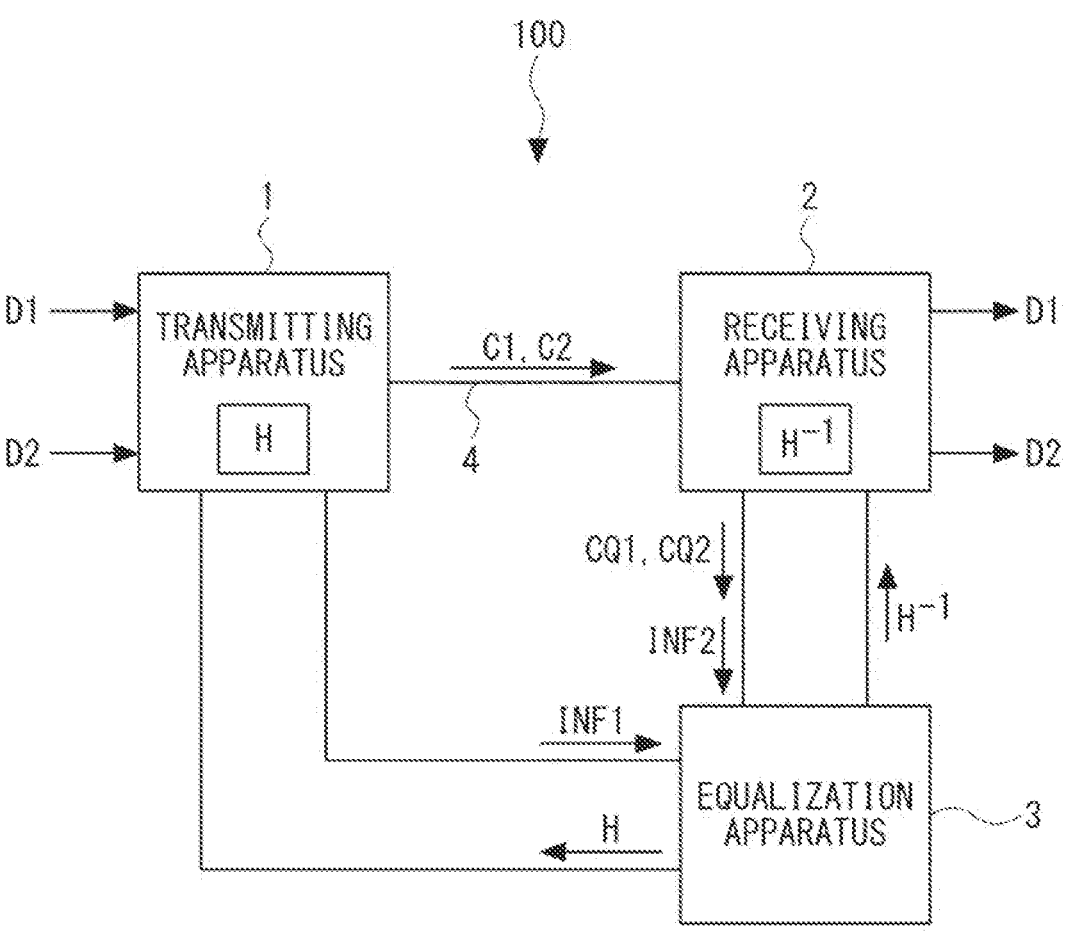
FIG. 1 schematically illustrates a configuration of an optical communication system according to a first example embodiment.

FIG. 1 schematically illustrates a configuration of an optical communication system 100 according to the first example embodiment. The optical communication system includes a transmitting apparatus 1, a receiving apparatus 2, and an equalization apparatus 3. The transmitting apparatus 1 and the receiving apparatus 2 are connected by an optical fiber cable 4. The optical signals of a plurality of channels are transmitted from the transmitting apparatus 1 to the receiving apparatus 2 through the optical fiber cable 4. The optical fiber cable 4 includes a plurality of optical fibers, and, for example, may include one or more multi-core fibers (MCF).

Figure 2:
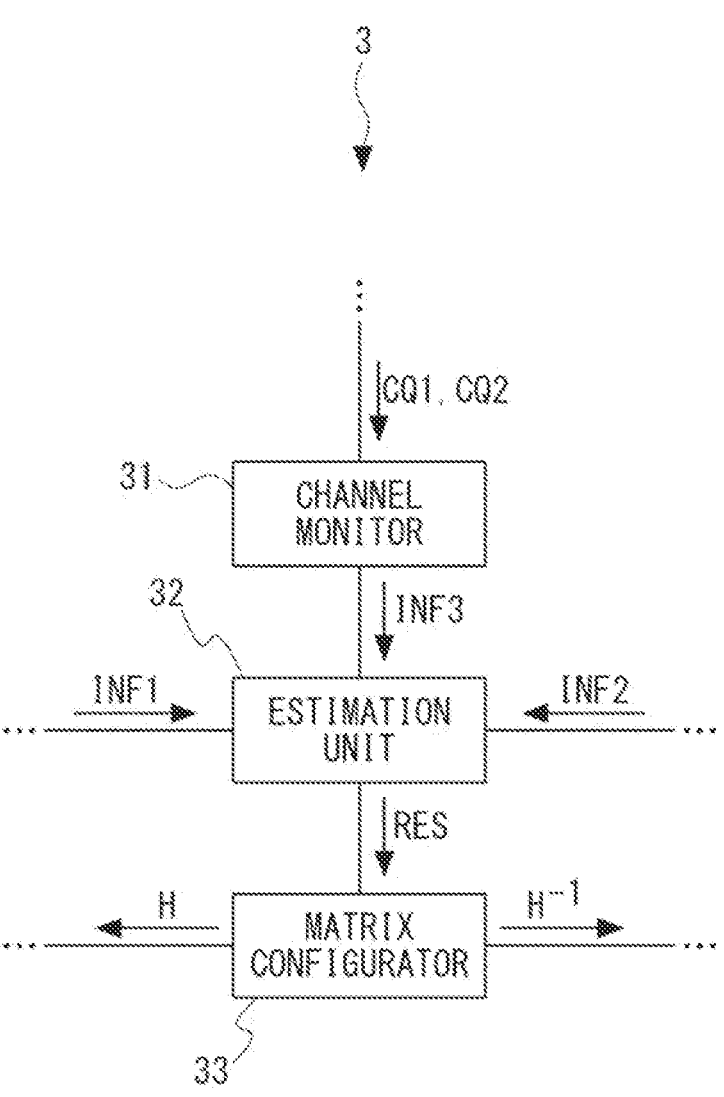
FIG. 2 schematically illustrates a configuration of an equalization apparatus according to the first example embodiment.
Figure 3:
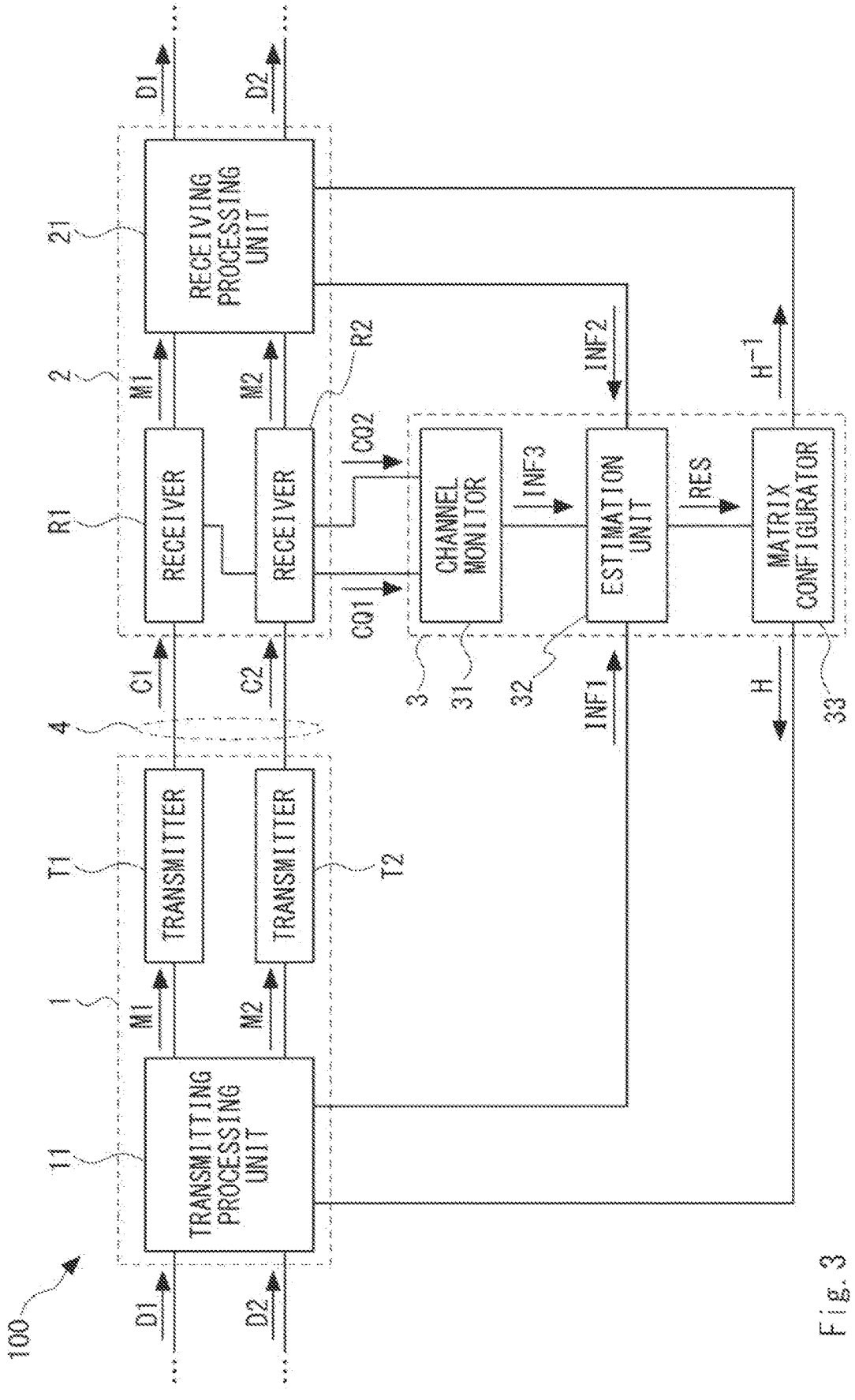
FIG. 3 schematically illustrates a detailed configuration of the optical communication system according to the first example embodiment.
Figure 4:
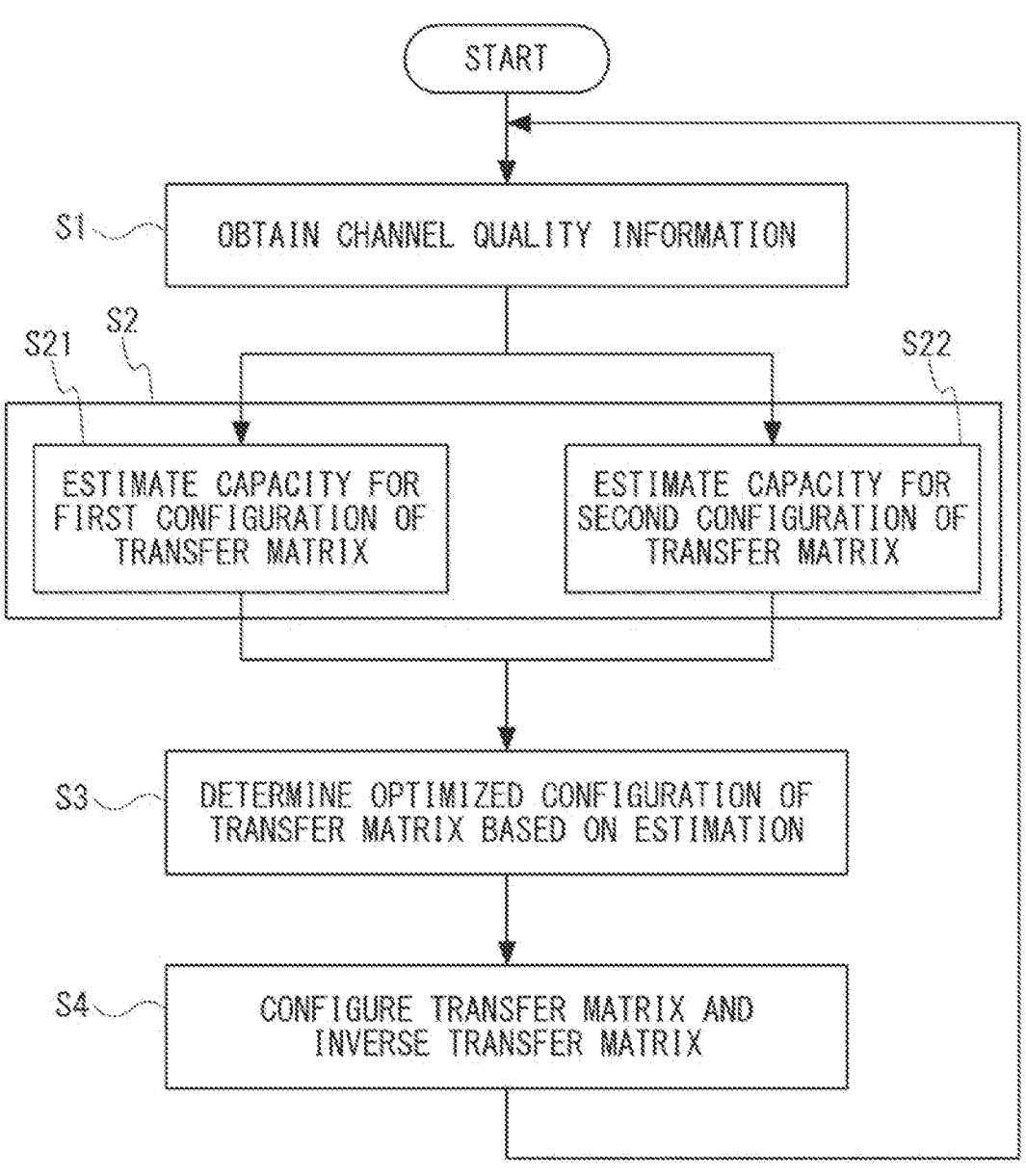
FIG. 4 is a flowchart illustrating the operation of the optical communication system according to the first example embodiment.

The configuration and operation of the optical communication system 100 will be described in detail with reference to FIGS. 2 to 4. FIG. 2 schematically illustrates a configuration of the equalization apparatus 3 according to the first example embodiment. FIG. 3 schematically illustrates a detailed configuration of the optical communication system 100 according to the first example embodiment. FIG. 4 is a flowchart illustrating the operation of the optical communication system 100 according to the first example embodiment.

The transmitting apparatus 1 processes data signals D1 and D2 input thereto with predetermined operations using 2×2 transfer matrix H to transmit optical signals of channels C1 and C2 through the optical fiber cable 4. The data signals D1 and D2 are vector signals coded for common modulation formats such as QPSK, 16QAM and 64QAM in a typical coherent fiber-optic transmission system after a plurality of operations such as mapping, coding and constellation shaping.

As illustrated in FIG. 3, the transmitting apparatus 1 includes a transmitting processing unit 11, and transmitters T1 and T2. The transmitting processing unit 11 processes the data signals D1 and D2 with the predetermined operations using the 2×2 transfer matrix H. The relationship between the data signals D1 and D2 and mixed data signals M1 and M2 obtained by the processing is described by Equation 1.
[Equation 1]

$$\begin{bmatrix} M1 \\ M2 \end{bmatrix} = H \begin{bmatrix} D1 \\ D2 \end{bmatrix} \qquad [1]$$

The transfer matrix H includes a first configuration H1 and a second configuration H2. Either of the configurations is applied to the present configuration and is determined by the matrix configurator 33. The first configuration H1 is a 2×2 identity matrix as described by Equation 2.

[Equation 2]

$$H1 = \begin{bmatrix} 1 & 0 \\ 0 & 1 \end{bmatrix} \qquad [2]$$

The second configuration H2 is an element-wise product, in other words, the Hadamard product, of a 2×2 complex Hadamard matrix F2 and a 2×2 coefficient matrix K2 as described by Equation 3. Note that σ1 and σ2 in the coefficient matrix K2 will be described later.

[Equation 3]

$$H2 = F2 \circ K2 = \begin{bmatrix} 1 & 1 \\ 1 & -1 \end{bmatrix} \circ \begin{bmatrix} \sqrt{\dfrac{\sigma_1}{\sigma_1 + \sigma_2}} & \sqrt{\dfrac{\sigma_1}{\sigma_1 + \sigma_2}} \\ \sqrt{\dfrac{\sigma_2}{\sigma_1 + \sigma_2}} & \sqrt{\dfrac{\sigma_2}{\sigma_1 + \sigma_2}} \end{bmatrix} = \qquad [3]$$

$$\begin{bmatrix} \sqrt{\dfrac{\sigma_1}{\sigma_1 + \sigma_2}} & \sqrt{\dfrac{\sigma_1}{\sigma_1 + \sigma_2}} \\ \sqrt{\dfrac{\sigma_2}{\sigma_1 + \sigma_2}} & -\sqrt{\dfrac{\sigma_2}{\sigma_1 + \sigma_2}} \end{bmatrix}$$

It is noted that Equation 3 is merely an example of the second configuration H2 for the transfer matrix H, and, however, the second configuration H2 is not limited to this. Any other normalized orthogonal matrix with an element-wise product of the same size coefficient matrix may be appropriately used as the second configuration H2.

The transmitting processing unit 11 outputs the mixed data signals M1 and M2 obtained by the processing to the transmitters T1 and T2, respectively. The transmitters T1 and T2 execute necessary operations, such as electrical-optical modulation and amplification, on the mixed data signals M1 and M2 to convert them into the optical signals of channels C1 and C2, respectively. The optical signals of channels C1 and C2 are transmitted to the receiving apparatus 2 through the optical fiber cable 4.

The receiving apparatus 2 receives the optical signals of channels C1 and C2 and transforms them into the original data signals D1 and D2, respectively. As illustrated in FIG. 3, the receiving apparatus 2 includes a receiving processing unit 21, and receivers R1 and R2. The receivers R1 and R2 receive the optical signals of channels C1 and C2 from the transmitters T1 and T2 through the optical fiber cable 4, respectively. Then, the receivers R1 and R2 execute necessary operations, such as optical-electrical demodulation and amplification, on the optical signals of channels C1 and C2 to convert them into the mixed data signals M1 and M2, respectively. The converted mixed data signals M1 and M2 are output to the receiving processing unit 21.

The receiving processing unit 21 executes recovery processing on the mixed data signals M1 and M2. Specifically, the receiving processing unit 21 processes the mixed data signals M1 and M2 with predetermined operations using the 2×2 inverse transfer matrix H⁻¹, which is an inverse of the 2×2 transfer matrix H, to transform the mixed data signals M1 and M2 into the original data signals D1 and D2, respectively. The relationship between the data signals D1 and D2 and the mixed data signals M1 and M2 is described by Equation 4.

[Equation 4]

$$\begin{bmatrix} D1 \\ D2 \end{bmatrix} = H^{-1} \begin{bmatrix} M1 \\ M2 \end{bmatrix} \qquad [4]$$

The equalization apparatus 3 is configured to maximize overall data rate of multiplexing transmission in the optical communication system 100. As illustrated in FIGS. 2 and 3, the equalization apparatus 3 includes a channel monitor 31, an estimation unit 32, and a matrix configurator 33.

The channel monitor 31 receives channel quality information CQ1 and CQ2 of the channel C1 and C2 from the receiving apparatus 2 and output the information INF3 including the channel quality information CQ1 and CQ2 to the estimation unit 32 as in Step S1 in FIG. 4. Note that the information INF3 includes but not limited to the channel quality information of all channels. The information INF3 is also referred to as first information.

In the present example embodiment, the channel quality information CQ1 and CQ2 is represented as noise power, which can be measured in the receiving unit 2. Here, the noise power measured in the channel C1 is represented as NP1 and the noise power measured in the channel C2 is represented as NP2. In this case, the coefficient matrix K2 for the second configuration H2 of the transfer matrix H is determined by Equations 5 and 6.

[Equations 5]

$$\sigma_1 = \sqrt{NP1} \qquad [5]$$

[Equations 6]

$$\sigma_2 = \sqrt{NP2} \qquad [6]$$

The channel quality information may be also represented as a signal-to-noise ratio (SNR) in the receiving unit 2. Here, the SNR measured in the channel C1 is represented as SNR1 and the SNR measured in the channel C2 is represented as SNR2. In this case, the coefficient matrix K2 for the second configuration H2 of the transfer matrix H is determined by Equations 7 and 8.

[Equations 7]

$$\sigma_1 = \frac{1}{\sqrt{SNR1}} \qquad [7]$$

$$\sigma_2 = \frac{1}{\sqrt{SNR2}} \qquad [8]$$

The estimation unit 32 estimates the SDM transmission capacities in the optical communication system 100 by comparing the first configuration H1 and the second configuration H2 as shown in Steps S2 in FIG. 4. The estimation unit 32 requires related information to accurately estimate the overall capacity of optical communication system 100. In this case, the estimation unit 32 receives information INF1 from the transmitting apparatus 1 and information INF2 from the receiving apparatus 2 as the related information.

The information INF1 and the information INF2 may include channel quality related information such as an optical signal to noise ratio (OSNR), SNR, EVM, and a channel spacing. The channel quality related information is obtained by the channel monitor 31.

The information INF1 and the information INF2 may further include signal related information such as modulation format, a forward error coding (FEC) configuration, a pulse shape type, a roll-off factor, a symbol rate, PCS shaping factor, an oversampling rate, a polarization type, a shaping factor when the signal is probabilistically constellation shaped, and a geometric mapping when the signal is geometric constellation shaped. The signal related information is obtained from either or both of the transmitting apparatus 1 and the receiving apparatus 2, since the transmitting processing unit and the receiving processing unit generally share the same knowledge of such signal related information for general transmission. Thus, all of the signal related information can be obtained from either of those apparatuses, and also a part of the signal related information can be obtained one of those apparatuses and the rest of information can be obtained from the other of those apparatuses.

Note that the information INF1 and INF2 can include but not limited to those.

Then, the estimation unit 32 estimates the capacity of the SDM transmission in the optical communication system 100 based on the information INF1 to INF3 and outputs an estimation result RES to the matrix configurator 33. Note that the information INF1 is also referred to as second information and the information INF2 is also referred to as third information.

Figure 5:
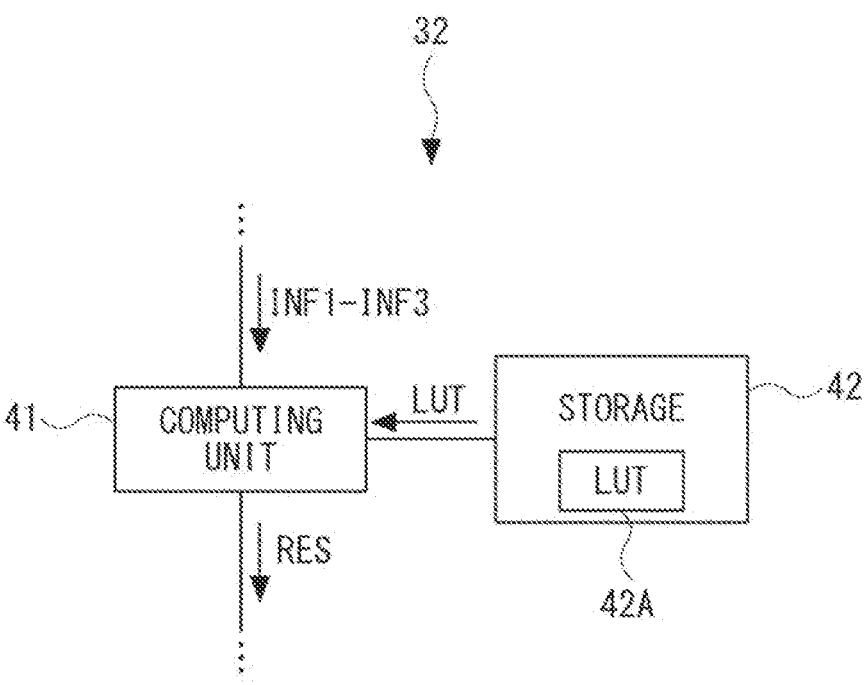
FIG. 5 illustrates a first example configuration of an estimation unit.

Here, configuration examples of the estimation unit 32 will be described. FIG. 5 illustrates a first example configuration of the estimation unit 32. In this example, the estimation unit 32 includes a computing unit 41 and a storage 42. For example, the storage 42 holds a look-up table (LUT) 42A including estimation parameters that indicate the SDN transmission capacities in the optical communication system 100. The LUT 42A can be predetermined by simulation or experiment.

Figure 6:
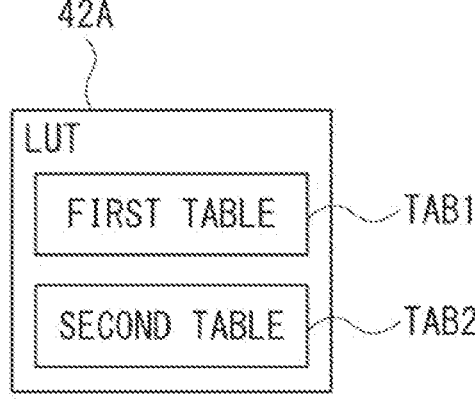
FIG. 6 illustrates a configuration of a look up table (LUT)

An example of the LUT where there are two channels (e.g., two-core multi-core fiber transmission system) will be described. FIG. 6 illustrates a configuration of the LUT 42A. In this case, the LUT includes a first table TAB1 and a second table TAB2 are stored in the storage 42.

Figure 7:
FIG. 7 illustrates an example of a first table.

The first table TAB1 includes the input values of two channels are pre-equalization channel quality, and the output values are post-equalization channel quality. FIG. 7 illustrates an example of the first table TAB1.

Since channels have the same channel quality after equalization, there is only one column of the output values in the first table TAB1. The input values are usually selected with a reasonable range determined by the specifications of the transmission system, i.e., the optical communication system 100, in a practical application scenario. The first table TAB1 is configured to cover the possible range that the channel quality may vary during transmission.

The output values may be either generated from experiment or simulation in advance. In case of experiment, the configuration of the transmitter and receiver that same as the target transmission system should be used, but a controlled noise source such as amplified spontaneous emission (ASE) is necessary to generate required channel quality for different channels. In case of simulation, it is possible to calculate the post-equalization channel quality from arbitrary pre-equalization channel quality of the channels by building a simulation model for the target transmission system.

Figure 8:
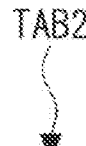
FIG. 8 illustrates an example of a second table.

The second table TAB2 includes input values that represent channel quality, output values that represent channel capacity. FIG. 8 illustrates an example of the second table TAB2 in the estimation unit.

The input values are also selected with the reasonable range determined by the transmission specifications in the practical application scenario as in the case of the first table TAB1. The output values may be determined from experiment, simulation or transmission system specification. The experiment or simulation is similar to those of the first table TAB1.

The computing unit 41 reads the estimation parameters from the storage 42 and fetches the corresponding transmission capacities by matching the estimation parameters, and the first configuration H1 and the second configuration H2. Specifically, in the case of FIGS. 7 and 8, the overall transmission capacity with the first configuration H1 is estimated by summarizing the channel capacity output values in the second table TAB2 corresponding to the channel quality information. For the second configuration H2, the post-equalization channel quality is estimated from the first table TAB1. Then the post-equalization channel quality is used as the input of the second table TAB2 to estimate the overall transmission capacity. At last, the overall transmission capacity of the first configuration H1 and that of the second configuration H2 are compared and the configuration with higher capacity will be selected as the output of the estimation unit 32.

A specific operation example of the channel monitor 31 and the estimation unit 32 will be described according to the LUT illustrated in FIGS. 7 and 8. Here, a case where the channel quality in the channel 1 is 8 and the channel quality in the channel 2 is 10 will be described. The channel monitor 31 notifies the estimation unit 32 of those channel quality information. For the first configuration H1, the estimation unit 32 refers to the second table TAB2 and thereby the total capacity is 80+150=230 Gbps. For the second configuration H2, the post-equalization channel quality is firstly estimated from the first table TAB1 as 9. Then, the total capacity is estimated from the second table TAB2 as 100×2=200 Gbps. Since the total capacity of the first configuration H1 (230 Gbps) is higher than that of the second configuration H2 (200 Gbps), the estimation unit 32 will instruct the matrix configurator 33 to use the first configuration H1.

Note that, although the example of estimating the capacity of the system, in other words, the example in which the output value of the second table TAB2 is the channel capacity, has been described, it is merely an example. A spectral efficiency and mutual information of the system may be estimated in the present example embodiment. In sum, one of the capacity, the spectral efficiency, and the mutual information of the system may be estimated as an indicator (also referred to as a first objective) of the optical communication system 100.

It is noted that the abovementioned estimation operations can be triggered during the normal transmission once the channel monitor finds a change in the channel quality.

It is also noted that the signal related information INF1 or INF2 may be not included in the lookup tables for simplification. It is possible that a transmission system has multiple sets of the signal-related configuration so that the input values of both the first table and second table may include the signal related configurations.

It is also noted that the LUT may have only one table, which is the combination of the first table, the second table, and the comparison operation. The input values will be the channel quality in all channels. The output values will be the configuration with higher capacity (H1 or H2).

Figure 9:
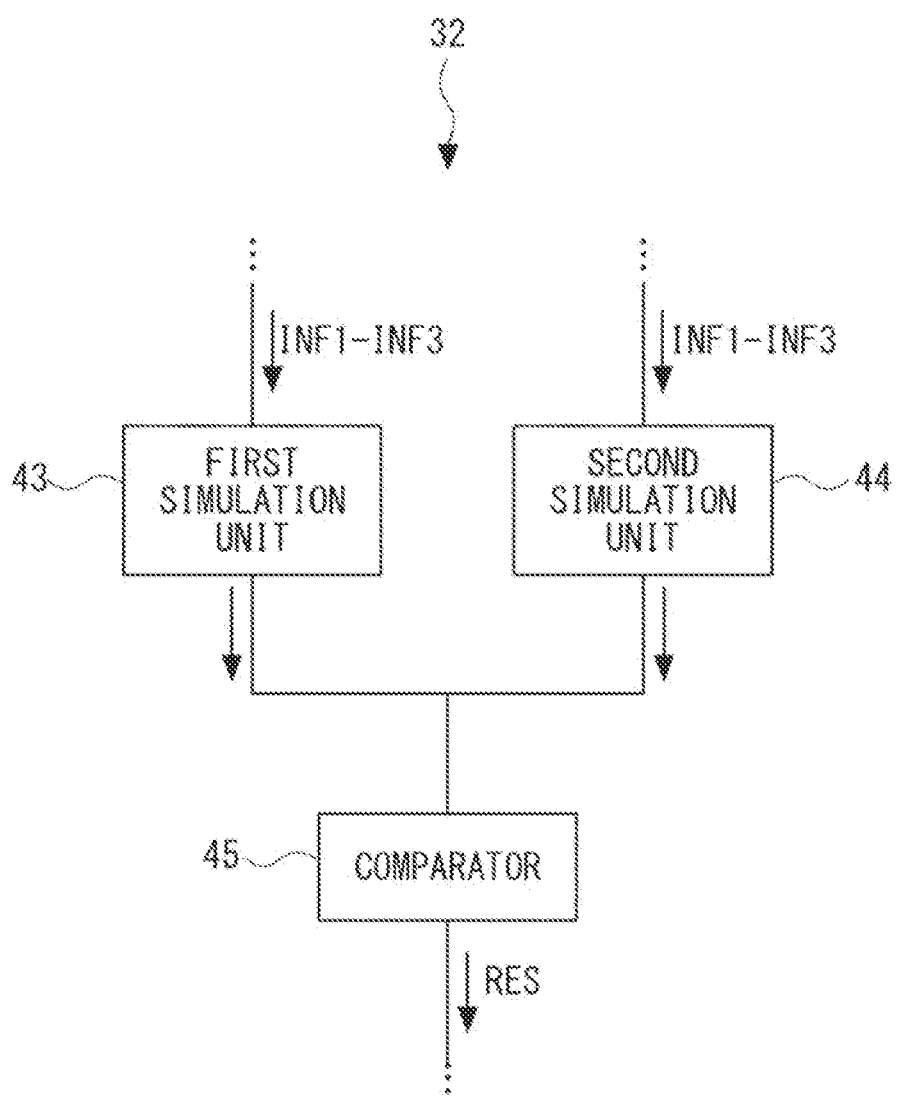
FIG. 9 illustrates a second example configuration of an estimation unit.

FIG. 9 illustrates a second example configuration of the estimation unit 4. In this example, the estimation unit 32 includes a first simulation unit 43, a second simulation unit 44, and a comparator 45. The first simulation unit 43 is configured to simulate the transmission capacity with the estimation parameters with the first configuration H1. Especially, the first simulation unit 43 obtains the post-equalization channel quality and the channel capacity as in TAB1 and TAB2 by the simulation for the first configuration H1. The second simulation unit 44 is configured to simulate the transmission capacity with the estimation parameters with the second configuration H2. Especially, the second simulation unit 44 obtains the post-equalization channel quality and the channel capacity as in TAB1 and TAB2 by the simulation for the second configuration H2. As an example, Step S21 corresponding to the simulation of first configuration H1 and Step S22 corresponding to the simulation of second configuration H2 are illustrated in Step S2 in FIG. 4. The comparator 45 is configured to compare the simulation results of the first simulation unit 43 and the second simulation unit 44, and output the comparison result RES to the matrix configurator 33. It is noted that the first simulation unit 43 and the second simulation unit 44, in other words, Steps S21 and S22, can be either in parallel or serial, and the order thereof does not matter.

The matrix configurator 33 determines an optimized configuration of the transfer matrix H and the inverse transfer matrix $H^{-1}$ based on the estimation result RES to maximize the capacities of the SDM transmission in the optical transmission system 100 as in Step S3 in FIG. 4. Then, the matrix configurator 33 configures the transfer matrix H and the inverse transfer matrix $H^{-1}$ based on the previous determination as in Step S4 in FIG. 4. The configured transfer matrix H is sent to the transmitting apparatus 1 and thereby the transfer matrix H in the transmitting apparatus 1 is updated. The configured inverse transfer matrix $H^{-1}$ is sent to the receiving apparatus 2 and thereby the inverse transfer matrix $H^{-1}$ in the receiving apparatus 2 is updated.

It is noted that the estimation unit 32 and the matrix configurator 33 are not limited to be placed on the receiving side of the transmission system, and they may be placed on the transmitting side or in other places.

It is noted that the abovementioned configurations of the channel monitor 31 and the matrix configurator 33 are merely examples. The channel quality information may include the noise power level, SNR, OSNR, Q-factor, a bit error rate (BER), or an error vector magnitude. Any methods for obtaining the channel quality information may be applied to the present example embodiment. Any information that can be used to indicate the channel quality differences between channels may be applied to the present example embodiment.

According to the present configuration, the equalization apparatus 3 can maximize the overall capacity for the SDM transmission in the optical communication system 100 regardless of whether the signal is in the format of traditional QAM or constellation shaping.

Second Example Embodiment

In the first example embodiment, for simplification, the configuration corresponding to only two data signals has been described. However, the optical communication system of the present configuration may be applied to any number of data signals.

FIG. 10 schematically illustrates a configuration of an optical communication system 200 according to a second example embodiment. The optical communication system 200 is configured to correspond to N channels where N is an integer equal to or more than two. In the optical communication system 200, transmitters T1 to TN and receivers R1 to RN are disposed.

As in the first example embodiment, the transmitting processing unit 11 processes the data signals D1 to DN with the predetermined operations using the N×N transfer matrix H and outputs the mixed data signals M1 to MN to the transmitters T1 to TN, respectively. In this case, the relationship between the data signals D1 and D2 and the mixed data signals M1 and M2 is described by Equation 9.

[Equation 9]

$$\begin{bmatrix} M1 \\ M2 \\ \vdots \\ MN \end{bmatrix} = H \begin{bmatrix} D1 \\ D2 \\ \vdots \\ DN \end{bmatrix} \qquad [9]$$

The first configuration H1 an N×N identity matrix as described by Equation 10.

[Equation 10]

$$H1 = \begin{bmatrix} 1 & 0 & \cdots & 0 \\ 0 & 1 & \cdots & 0 \\ \vdots & \vdots & \ddots & \vdots \\ 0 & 0 & \cdots & 1 \end{bmatrix} \qquad [10]$$

When the number of the channels is two (i.e., N=2), the transfer matrix can be configured as the Hadamard product of a 2×2 real Hadamard matrix F2 and a 2×2 coefficient matrix K2 as described above. This is the same to the case where the number of the channels is four (i.e., N=4).

In contrast, the number of the channels is three, five or more (i.e., N=3, N=>5), the second configuration H2 can be configured as an element-wise product, in other words, the Hadamard product, of an N×N complex Hadamard matrix F2 and an N×N coefficient matrix K2 as described by Equation 11. Note that sigma 1 to sigma N in the coefficient matrix K2 will be described later.

[Equation 11]

$$H2 = F2 \circ K2 = F2 \circ \begin{bmatrix} \sqrt{\dfrac{\sigma_1}{\sigma_1 + \ldots + \sigma_N}} & \cdots & \sqrt{\dfrac{\sigma_1}{\sigma_1 + \ldots + \sigma_N}} \\ \vdots & \ddots & \vdots \\ \sqrt{\dfrac{\sigma_N}{\sigma_1 + \ldots + \sigma_N}} & \cdots & \sqrt{\dfrac{\sigma_N}{\sigma_1 + \ldots + \sigma_N}} \end{bmatrix} \qquad [11]$$

where, when j denotes a column number and k denotes a row number, an element $F_{jk}$ of the complex Hadamard matrix F2 for j, k=1, 2, . . . , N is described by Equation 12.

[Equation 12]

$$f_{jk} = \exp\left[\frac{2\pi i(j-1)(k-1)}{N}\right] \qquad [12]$$

When i denotes a channel number and the noise power measured in the channel Ci is represented as NPi, the coefficient matrix K2 may be determined by Equation 13 as in Equations 5 and 6.

[Equation 13]

$$\sigma_i = \sqrt{NPi} \tag{13}$$

Further, when the SNR measured in the channel Ci is represented as SNRi, the coefficient matrix K2 may be determined by Equation 14 as in Equations 7 and 8.

[Equation 14]

$$\sigma_i = \frac{1}{\sqrt{SNRi}} \tag{14}$$

The transmitters T1 to TN execute necessary operations on the mixed data signals M1 to MN to convert them into the optical signals of channels C1 to CN, respectively. The optical signals of channels C1 to CN are transmitted to the receiving apparatus 2 through the optical fiber cable 4.

The receivers R1 to RN receive the optical signals of channels C1 to CN from the transmitters T1 to TN through the optical fiber cable 4, respectively. Then, the receivers R1 to RN execute necessary operations on the optical signals of channels C1 to CN to convert them into the mixed data signals M1 to MN, respectively. The converted mixed data signals M1 to MN are output to the receiving processing unit 21. The receiving processing unit 21 processes the mixed data signals M1 to MN with predetermined operations using the N×N inverse transfer matrix H$^{-1}$, which is an inverse of the N×N transfer matrix H, to transform the mixed data signals M1 to MN into the original data signals D1 to DN, respectively.

The channel monitor 31 receives channel quality information CQ1 to CQN of the channel C1 to CN from the receiving apparatus 2 and outputs the information INF3 including the channel quality information CQ1 and CQ2 to the estimation unit 32.

The configuration and operation of the optical communication system 200 are the same as those of the optical communication system 100, and thereby descriptions thereof will be omitted.

According to the present configuration, although the number of the data signals and channels may be there or more, the equalization apparatus 3 can also maximize the overall capacity for the SDM transmission in the optical communication system 200 regardless of whether the signal is in the format of traditional QAM or constellation shaping.

OTHER EXAMPLE EMBODIMENTS

The present invention is not limited to the above-described example embodiments, and can be modified as appropriate without departing from the scope of the invention. For example, as described above, an example of a hardware configuration of the equalization unit 3 has been described in the above example embodiments, the configuration is not limited thereto. Any processing of the equalization unit 3 may be attained by causing a CPU (Central Processing Unit) to execute a computer program. In this case, the equalization unit 3 may have the same configuration illustrated in FIG. 5.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

A part of or all of the above-described example embodiments can be described as in the following supplementary notes. However, the present invention is not limited to the following supplementary notes.

(Supplementary Note 1)

An equalization apparatus including: channel monitoring means for monitoring channel quality information of a plurality of optical signals of a plurality of channels transmitted from a transmitting apparatus and received by a receiving apparatus, and outputting first information including the monitored channel quality information, the transmitting apparatus processing a plurality of data signals to transform them into a plurality of mixed data signals using a transfer matrix and converting the plurality of mixed signals into the plurality of optical signals; estimation means for estimating transmission capacity between the transmitting apparatus and the receiving apparatus based on the first information and second information received from the transmitting apparatus, and outputting an estimation result; and matrix configurating means for configuring the transfer matrix based on the estimation result to optimize the transmission capacity between the transmitting apparatus and the receiving apparatus, and outputting the configured transfer matrix to the transmitting apparatus for updating the transfer matrix therein.

(Supplementary Note 2)

The equalization apparatus according to Supplementary note 1, wherein the first objective is a performance factor that includes one of a transmission capacity, mutual information, and a spectral efficiency.

(Supplementary Note 3)

The equalization apparatus according to Supplementary note 1 or 2, in which the channel quality information of each channel includes one of a noise power level, a signal to noise ratio, an optical signal to noise ratio, a bit error rate, and an error vector magnitude.

(Supplementary Note 4)

The equalization apparatus according to Supplementary note 3, in which the second information includes at least one of a forward error coding rate, a pulse shaping type, a roll-off factor, a symbol rate, an oversampling rate, a channel spacing, a polarization type, a shaping factor when the signal is probabilistically constellation shaped, a geometric mapping when the signal is geometric constellation shaped.

(Supplementary Note 5)

The equalization apparatus according to any one of Supplementary notes 1 to 4, in which the receiving apparatus converts the plurality of optical signals into the plurality of mixed data signals and processes the plurality of mixed data signals to transform them into the plurality of data signals by using an inverse transfer matrix that is an inverse of the transfer matrix, the estimation means estimates the transmission capacity between the transmitting apparatus and the receiving apparatus based on the first and second information, and third information received from the receiving apparatus, and outputs the estimation result; and the matrix configuration means configures the inverse transfer matrix based on the first to third information to optimize the transmission capacity between the transmitting apparatus and the receiving apparatus, and outputs the configured inverse transfer matrix to the receiving apparatus for updating the inverse transfer matrix therein.

(Supplementary Note 6)

The equalization apparatus according to Supplementary note 5, in which the transfer matrix is a square matrix having the same number of columns and rows as the number of the plurality of channels, and the square matrix has a first configuration and a second configuration switched by the matrix configuration means according to a predetermined rule.

(Supplementary Note 7)

The equalization apparatus according to Supplementary note 6, in which the first configuration of the transfer matrix is an identity matrix, and the second configuration of the transfer matrix is configured to achieve more signal power to a channel with lower channel quality.

(Supplementary Note 8)

The equalization apparatus according to Supplementary note 7, in which the second configuration H2 of the transfer matrix is an element-wise product of an N×N complex Hadamard matrix F2 and an N×N coefficient matrix K2 as described by the following equation:

[Equations 15]

$$H2 = F2 \circ K2 = F2 \circ \begin{bmatrix} \sqrt{\dfrac{\sigma_1}{\sigma_1 + \dots + \sigma_N}} & \cdots & \sqrt{\dfrac{\sigma_1}{\sigma_1 + \dots + \sigma_N}} \\ \vdots & \ddots & \vdots \\ \sqrt{\dfrac{\sigma_N}{\sigma_1 + \dots + \sigma_N}} & \cdots & \sqrt{\dfrac{\sigma_N}{\sigma_1 + \dots + \sigma_N}} \end{bmatrix} \quad [15]$$

where N denotes the number of the plurality of channels, and when j denotes a column number and k denotes a row number, an element $F_{jk}$ of the complex Hadamard matrix F2 for j, k=1, 2, . . . , N is described by the following Equation:

[Equations 16]

$$f_{jk} = \exp\left[\frac{2\pi i(j-1)(k-1)}{N}\right] \quad [16]$$

(Supplementary Note 9)

The equalization apparatus according to Supplementary note 7, in which when i denotes a channel number and noise power measured in a channel Ci is represented as NPi, the coefficient matrix K2 may be determined by the following Equation:

[Equation 17]

$$\sigma_i = \sqrt{NPi} \quad [17]$$

or when a signal to noise ratio measured in the channel Ci is represented as SNRi, the coefficient matrix K2 may be determined by the following Equation:

[Equation 18]

$$\sigma_i = \frac{1}{\sqrt{SNRi}} \quad [18]$$

(Supplementary Note 10)

The equalization apparatus according to Supplementary note 7 or 8, in which the estimation means estimates an indicator of transmission system with the first configuration and the second configuration, and the indicator includes one of a capacity, a spectral efficiency, mutual information, and a data rate.

(Supplementary Note 11)

The equalization apparatus according to any one of Supplementary notes 5 to 10, in which the matrix configurating means determines the transfer matrix based on the estimation result, and the configuration with higher indicator from the estimation means is configured for the transfer matrix.

(Supplementary Note 12)

The equalization apparatus according to Supplementary note 11, in which the estimation means estimates the indicator of a transmission system for the first configuration and the second configuration using the first and second information.

(Supplementary Note 13)

The equalization apparatus according to any one of Supplementary notes 5 to 12, in which the estimation means: refers to information indicating channel quality to obtain desired equalized channel quality according to the first to third information, refers to information indicating a desired first objective corresponding to the desired equalized channel quality to obtain the desired first objective, and outputs the estimation result based on the desired first objective.

(Supplementary Note 14)

The equalization apparatus according to Supplementary note 13, the information indicating channel quality and the information indicating the desired first objective are provided as predetermined look-up tables.

(Supplementary Note 15)

The equalization apparatus according to Supplementary note 13, in which the information indicating channel quality and the information indicating the desired first objective as predetermined simulation models.

(Supplementary Note 16)

An optical communication system including: a transmitting apparatus configured to process a plurality of data signals to transform them into a plurality of mixed data signals using a transfer matrix and to convert the plurality of mixed signals into a plurality of optical signals; a receiving apparatus configured to receive the plurality of optical signals transmitted from the transmitting apparatus; and an equalization apparatus, in which the equalization apparatus includes: channel monitoring means for monitoring channel quality information of the plurality of optical signals of a plurality of channels transmitted from the transmitting apparatus and received by the receiving apparatus, and outputting first information including the monitored channel quality information; estimation means for estimating transmission capacity between the transmitting apparatus and the receiving apparatus based on the first information and second information received from the transmitting apparatus, and outputting an estimation result; and matrix configurating means for configuring the transfer matrix based on the estimation result to optimize the transmission capacity between the transmitting apparatus and the receiving apparatus, and outputting the configured transfer matrix to the transmitting apparatus for updating the transfer matrix therein.

(Supplementary Note 17)

An equalizing method of optical signals including: monitoring channel quality information of a plurality of optical signals of a plurality of channels transmitted from a transmitting apparatus and received by a receiving apparatus, and outputting first information including the monitored channel quality information, the transmitting apparatus processing a plurality of data signals to transform them into a plurality of mixed data signals using a transfer matrix and converting the plurality of mixed signals into the plurality of optical signals; estimating transmission capacity between the transmitting apparatus and the receiving apparatus based on the first information and second information received from the transmitting apparatus, and outputting an estimation result; and configuring the transfer matrix based on the estimation result to optimize the transmission capacity between the transmitting apparatus and the receiving apparatus, and outputting the configured transfer matrix to the transmitting apparatus for updating the transfer matrix therein.

(Supplementary Note 18)

A program of equalizing optical signals, a computer executing the program to execute steps of: monitoring channel quality information of a plurality of optical signals of a plurality of channels transmitted from a transmitting apparatus and received by a receiving apparatus, and outputting first information including the monitored channel quality information, the transmitting apparatus processing a plurality of data signals to transform them into a plurality of mixed data signals using a transfer matrix and converting the plurality of mixed signals into the plurality of optical signals; estimating transmission capacity between the transmitting apparatus and the receiving apparatus based on the first information and second information received from the transmitting apparatus, and outputting an estimation result; and configuring the transfer matrix based on the estimation result to optimize the transmission capacity between the transmitting apparatus and the receiving apparatus, and outputting the configured transfer matrix to the transmitting apparatus for updating the transfer matrix therein.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. An equalization apparatus comprising:

channel monitoring means for monitoring channel quality information of a plurality of optical signals of a plurality of channels transmitted from a transmitting apparatus and received by a receiving apparatus, and outputting first information including the monitored channel quality information, the transmitting apparatus processing a plurality of data signals to transform them into a plurality of mixed data signals using a transfer matrix and converting the plurality of mixed signals into the plurality of optical signals;

estimation means for estimating transmission a first objective between the transmitting apparatus and the receiving apparatus based on the first information and second information received from the transmitting apparatus, and outputting an estimation result; and matrix configurating means for configuring the transfer matrix based on the estimation result to optimize the first objective between the transmitting apparatus and the receiving apparatus, and outputting the configured transfer matrix to the transmitting apparatus for updating the transfer matrix therein.

2. The equalization apparatus according to claim 1, wherein the first objective is a performance factor that includes one of a transmission capacity, mutual information, and a spectral efficiency.

3. The equalization apparatus according to claim 1, wherein the channel quality information of each channel includes one of a noise power level, a signal to noise ratio, an optical signal to noise ratio, a bit error rate and an error vector magnitude.

4. The equalization apparatus according to claim 3, wherein the second information includes at least one of a forward error coding rate, a pulse shaping type, a roll-off factor, a symbol rate, an oversampling rate, a channel spacing, a polarization type, a shaping factor when the signal is probabilistically constellation shaped, a geometric mapping when the signal is geometric constellation shaped.

5. The equalization apparatus according to claim 1, wherein the receiving apparatus converts the plurality of optical signals into the plurality of mixed data signals and processes the plurality of mixed data signals to transform them into the plurality of data signals by using an inverse transfer matrix that is an inverse of the transfer matrix, the estimation means estimates the first objective between the transmitting apparatus and the receiving apparatus based on the first and second information, and third information received from the receiving apparatus, and outputs the estimation result; and the matrix configuration means configures the inverse transfer matrix based on the first to third information to optimize the first objective between the transmitting apparatus and the receiving apparatus, and outputs the configured inverse transfer matrix to the receiving apparatus for updating the inverse transfer matrix therein.

6. The equalization apparatus according to claim 5, wherein the transfer matrix is a square matrix having the same number of columns and rows as the number of the plurality of channels, and the square matrix has a first configuration and a second configuration switched by the matrix configuration means according to a predetermined rule.

7. The equalization apparatus according to claim 6, wherein the first configuration of the transfer matrix is an identity matrix, and the second configuration of the transfer matrix is configured to achieve more signal power to a channel with lower channel quality.

8. The equalization apparatus according to claim 7, wherein the second configuration H2 of the transfer matrix is an element-wise product of an N×N complex Hadamard matrix F2 and an N×N coefficient matrix K2 as described by the following equation:

[Equation 1]

$$H2 = F2 \circ K2 = F2 \circ \begin{bmatrix} \sqrt{\dfrac{\sigma_1}{\sigma_1 + \ldots + \sigma_N}} & \cdots & \sqrt{\dfrac{\sigma_1}{\sigma_1 + \ldots + \sigma_N}} \\ \vdots & \ddots & \vdots \\ \sqrt{\dfrac{\sigma_N}{\sigma_1 + \ldots + \sigma_N}} & \cdots & \sqrt{\dfrac{\sigma_N}{\sigma_1 + \ldots + \sigma_N}} \end{bmatrix} \quad [1]$$

where N denotes the number of the plurality of channels, and
when j denotes a column number and k denotes a row
number, an element $F_{jk}$ of the complex Hadamard
matrix F2 for j, k=1, 2, . . . , N is described by the
following Equation:

[Equation 2]

$$f_{jk} = \exp\left[\frac{2\pi i(j-1)(k-1)}{N}\right] \quad [2]$$

9. The equalization apparatus according to claim 7,
wherein, when i denotes a channel number and noise power
measured in a channel Ci is represented as NPi, the coeffi-
cient matrix K2 may be determined by the following Equa-
tion:

[Equation 17]

$$\sigma_i = \sqrt{NPi} \quad [3]$$

or when a signal to noise ratio measured in the channel Ci
is represented as SNRi, the coefficient matrix K2 may
be determined by the following Equation:

[Equation 18]

$$\sigma_i = \frac{1}{\sqrt{SNRi}} \quad [4]$$

10. The equalization apparatus according to claim 7,
wherein
the estimation means estimates an indicator of transmis-
sion system with the first configuration and the second
configuration, and
the indicator includes one of a capacity, a spectral effi-
ciency, mutual information, and a data rate.

11. The equalization apparatus according to claim 5,
wherein
the matrix configurating means determines the transfer
matrix based on the estimation result, and
the configuration with higher indicator from the estima-
tion means is configured for the transfer matrix.

12. The equalization apparatus according to claim 11,
wherein the estimation means estimates the indicator of a
transmission system for the first configuration and the sec-
ond configuration using the first and second information.

13. The equalization apparatus according to claim 5,
wherein
the estimation means:
refers to information indicating channel quality to obtain
desired equalized channel quality according to the first
to third information, refers to information indicating a desired first objective
corresponding to the desired equalized channel quality
to obtain the desired first objective, and
outputs the estimation result based on the desired first
objective.

14. The equalization apparatus according to claim 13,
wherein the information indicating channel quality and the
information indicating the desired first objective are pro-
vided as predetermined look-up tables.

15. The equalization apparatus according to claim 13,
wherein the information indicating channel quality and the
information indicating the desired first objective as prede-
termined simulation models.

16. An optical communication system comprising:
a transmitting apparatus configured to process a plurality
of data signals to transform them into a plurality of
mixed data signals using a transfer matrix and to
convert the plurality of mixed signals into a plurality of
optical signals;
a receiving apparatus configured to receive the plurality of
optical signals transmitted from the transmitting appa-
ratus; and
an equalization apparatus, wherein
the equalization apparatus comprises:
channel monitoring means for monitoring channel quality
information of the plurality of optical signals of a
plurality of channels transmitted from the transmitting
apparatus and received by the receiving apparatus, and
outputting first information including the monitored
channel quality information;
estimation means for estimating a first objective between
the transmitting apparatus and the receiving apparatus
based on the first information and second information
received from the transmitting apparatus, and output-
ting an estimation result; and
matrix configurating means for configuring the transfer
matrix based on the estimation result to optimize the
first objective between the transmitting apparatus and
the receiving apparatus, and outputting the configured
transfer matrix to the transmitting apparatus for updat-
ing the transfer matrix therein.

17. An equalizing method of optical signals comprising:
monitoring channel quality information of a plurality of
optical signals of a plurality of channels transmitted
from a transmitting apparatus and received by a receiv-
ing apparatus, and outputting first information includ-
ing the monitored channel quality information, the
transmitting apparatus processing a plurality of data
signals to transform them into a plurality of mixed data
signals using a transfer matrix and converting the
plurality of mixed signals into the plurality of optical
signals;
estimating a first objective between the transmitting appa-
ratus and the receiving apparatus based on the first
information and second information received from the
transmitting apparatus, and outputting an estimation
result; and
configuring the transfer matrix based on the estimation
result to optimize the first objective between the trans-
mitting apparatus and the receiving apparatus, and
outputting the configured transfer matrix to the trans-
mitting apparatus for updating the transfer matrix
therein.

\* \* \* \* \*